United States Patent [19]

Flohrer

[11] Patent Number: 5,042,006

[45] Date of Patent: Aug. 20, 1991

[54] METHOD OF AND CIRCUIT ARRANGEMENT FOR GUIDING A USER OF A COMMUNICATION OR DATA TERMINAL

[75] Inventor: Walter Flohrer, Beilstein, Fed. Rep. of Germany

[73] Assignee: Alcatel N. V., Amsterdam, Netherlands

[21] Appl. No.: 316,412

[22] Filed: Feb. 27, 1989

[30] Foreign Application Priority Data

Feb. 27, 1988 [DE] Fed. Rep. of Germany ....... 3806293

[51] Int. Cl.$^5$ .............................................. G06F 3/02
[52] U.S. Cl. ................... 364/900; 364/948.2; 364/948.21; 364/948.22; 364/945; 364/710.07
[58] Field of Search ................... 364/200, 900, 710.07, 364/710.08; 340/706

[56] References Cited

U.S. PATENT DOCUMENTS 4,947,346 8/1990 Kamiya ........................... 364/900 X

FOREIGN PATENT DOCUMENTS 3431902 8/1984 Fed. Rep. of Germany .
58-182752 10/1983 Japan .
60-186922 9/1985 Japan .
62-263256 12/1985 Japan .

OTHER PUBLICATIONS

Boye et al., "The Application Program Interface", BYTE Bonus Edition, Summer 1987, pp. 19-23.
"Der Bildschirmtextdienst der Deutschen Bundespost", Unterrichtsblatter, Jg. 36/1983 Nr. 8.

Primary Examiner—Eddie P. Chan
Assistant Examiner—Paul Kulik
Attorney, Agent, or Firm—Christie, Parker & Hale

[57] ABSTRACT

Visual and/or audible user prompts are adaptively provided to different users of a public video phone terminal (or other data or communication terminal) on the basis of user data which is determined during a predetermined sequence of user actions and compared with stored reference data. The time from the output of a prompt to the execution of an action by the user is measured, and the number of user errors per prompt is determined. The data thus obtained is compared with reference data characteristic of an average user. A user rated as unpracticed (i.e., below average) is then given more detailed prompts than an average user, and a user rated as practiced (i.e., above average) is given fewer or no prompts.

12 Claims, 3 Drawing Sheets

5,042,006

METHOD OF AND CIRCUIT ARRANGEMENT FOR GUIDING A USER OF A COMMUNICATION OR DATA TERMINAL

TECHNICAL FIELD

The present invention relates to a method of and a circuit arrangement for guiding a user of a communication or data terminal wherein stored prompts of a predetermined sequence of user actions are outputted on a screen under control of a control unit.

CLAIM FOR PRIORITY

This application is based on and claims priority from an application first filed in Fed. Rep. German on 27 Feb. 1989 under serial number P38 06 293.3. To the extent such prior application may contain any addition al information that might be of any assistance in the sue and understanding of the invention claimed herein, it is hereby incorporated by reference.

BACKGROUND ART

It is known that in order to operate a user terminal in a videotex system, e.g., a television receiver, the necessary steps in the search for desired information are performed in a dialog between the user and the videotex system. After establishment of a connection, an initial page is transmitted to the user, and the user is requested to enter a password. Then, messages, for example, are transmitted to the use, which can be called up by pressing a key. The dialog is normally ended by pressing a predetermined sequence of keys ("Der Bildschirmtextdienst der Deutschen Bundespost", Unterrichtsblätter der Deutschen Bundespost, Ausgabe B, Fernmeldewesen, Jg. 36/1983, No. 8, pages 345 to 350).

The increasing use of microprocessors, particularly in communication terminals, and the characteristics of the planned multi-service integrated networks, such as broad-band ISDN, make it possible to implement increasingly complex service features.

Such communication terminals, however, must not be operable only by trained experts. The use of office, home, and new public terminals must be possible for a large public.

It is the object of the present invention to provide a circuit arrangement and a method whereby flexible guidance is provided to different users of a communication or data terminal.

DISCLOSURE OF INVENTION

According to the invention, this object is attained by a circuit arrangement wherein flexible guidance is provided to different users on the basis of data input by the user and stored reference data. In particular, based on the time for the user to respond to a given prompt and/or any errors made by the user in responding to the prompt, the system may subsequently provide that particular user with more or less detailed guidance information.

The invention makes it possible to automatically adapt the user guidance for a communication or data terminal to the users' widely varying previous experience. A user with little previous experience will be given very detailed prompts, which will be reduced according to the user's degree of practice.

As a result, a practiced user, who only makes careless mistakes, will not be inhibited by unnecessary instructions, while less practiced users will be supported by the adaptive user guidance according to experience.

BRIEF DESCRIPTION OF DRAWINGS

An embodiment of the invention will now be explained with reference to the accompanying drawings, in which.

BEST MODE FOR CARRYING OUT THE INVENTION

Figure 2:
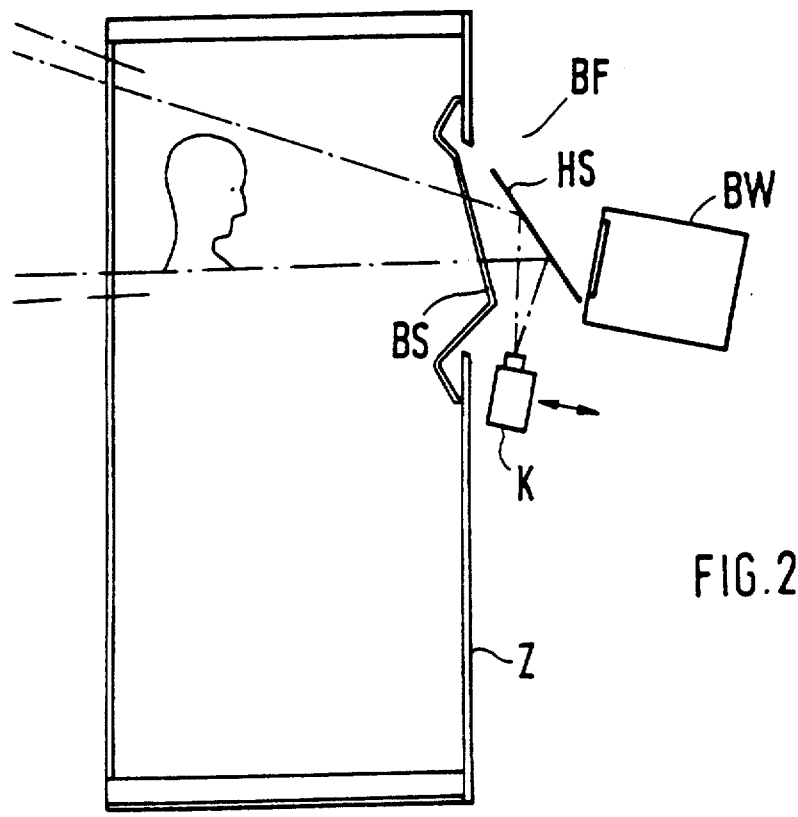
FIG. 2 is a schematic representation of a public video telephone.

A circuit arrangement according to the invention and a method according to the invention will be described with respect to a public telephone as shown schematically in FIG. 2.

A public telephone booth Z contains a video telephone BF consisting essentially of a video camera K and a video display unit BW. Since the video camera K and a picture tube of the video display unit BW are not situated on the same optical axis, a parallax results. To avoid this, a semitransparent mirror HS is positioned in the beam path between the video camera K and the user's position. This mirror deviates the beams coming from the video camera K so that their direction coincides with the direction of the beam path between the video display unit BW and the user. Such a video telephone BF is disclosed in commonly assigned published German patent application DE 34 31 902 A1.

The circuit arrangement for adaptive user guidance can be accommodated in the video display unit BW. It includes a control unit SE (FIG. 1), which is connected to a memory S, in which prompts of a predetermined sequence of actions to be taken by the user of the public video telephone are stored. The user prompts are outputted on a display unit AZ, in this case a screen BS of the video telephone BF, and/or acoustically through a loudspeaker L.

The control unit SE is connected to an input unit E (cf. Ffg. 3) and a time-measuring unit ZE. The time-measuring unit ZE is also connected to the input unit E to determine a period of time At which elapses from the output of a user prompt until operation of the input unit E. A user-error counter FR connected to the control unit SE counts the number of user errors per prompt. Also connected to the control unit SE is a reference-data register RR, in which reference data for the time period and the number of errors corresponding to the predetermined sequence of user actions are stored.

The control unit SE is also connected to a picture counter BR, which counts the number of outputted user prompts from zero to a final value K, and to a user counter TR, which serves to classify the user (as will be explained later).

The control unit SE can be implemented with a commercially available microprocessor with associated write, read, and program memories as well as input/output controls.

Figure 3:
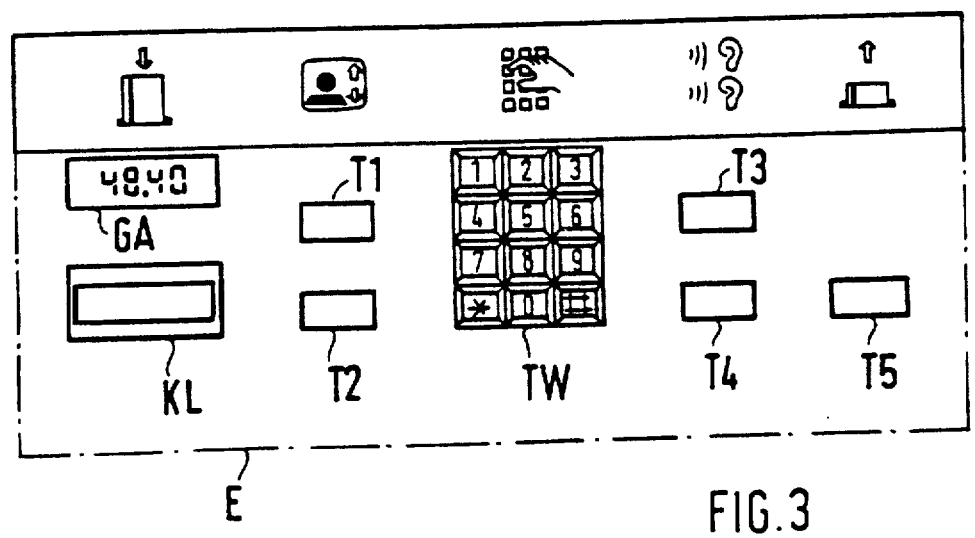
FIG. 3 shows an input unit according to the invention, for operating a public video telephone.

As shown in FIG. 3, the input unit E for operating the public video telephone BF has a card reader KL, which is connected to a credit display GA. To effect a vertical adjustment of the user's image being taken by the video camera K (cf. FIG. 2), the input unit E has a first key T1 and a second key T2 below the first key. Depression of the first key T1 causes the user's head to be moved up in the picture, and depression of the second key T2 causes the image to be shifted in the opposite direction.

The input unit E further includes a conventional push-button assembly TW for dialling. The video telephone BF has a hands-free facility (not shown), with the loudness of the reproduced sound being variable via a third key T3 (up) and a fourth key T4 (down). A fifth key T5 of the input unit E is provided for releasing the telephone connection and returning the credit card.

The method of providing adaptive guidance to the user of a public video telephone BF will now be explained with the aid of the flowchart of FIG. 4 in conjunction with the input unit E shown in FIG. 3.

The user of the video telephone BF must take the following predetermined sequence of five actions:
1. inserting the credit card into the card reader KL;
2. adjusting the image with the aid of the first and second keys T1, T2;
3. entering the call number to be dialled;
4. adjusting the loudness of the reproduced sound with the aid of the third and fourth keys T3, T4, and
5. releasing the connection with the aid of the fifth key T5.

The reference data to be entered into the reference-data register RR are, as a rule, determined by user tests involving a sufficiently large number of test subjects ("learning phase").

From the time values determined for each user prompt, a time-average value $\bar{t}n$ is calculated, and to predetermine an interval, an upper limit value $\bar{t}n + a \times sn$ and a lower limit value $\bar{t}n - a \times sn$ are determined from the standard deviation sn, where the constant $a \geq 1$.

Correspondingly, average values can be predetermined for the number of user errors per prompt. In the present case, a reference value of zero, i.e., zero errors per prompt, is assumed for simplicity.

It is assumed that the picture counter BR has the value BR=0 at the beginning of a user guidance, and that a final value of K=4 is set for the five user actions. The user counter TR also has an initial value of TR=0, with a count of TR=0 being characteristic of an average user, i.e., a user corresponding to the reference values. A negative count, TR<0, marks an unpracticed user, and a count TR>0 a practiced user.

The count of the user-error counter FR is initially FR=0. At the end of each user action, the user-error counter FR is set to zero by the control unit SE. The user-error counter has a preset maximum count of FR=3.

Figure 4:
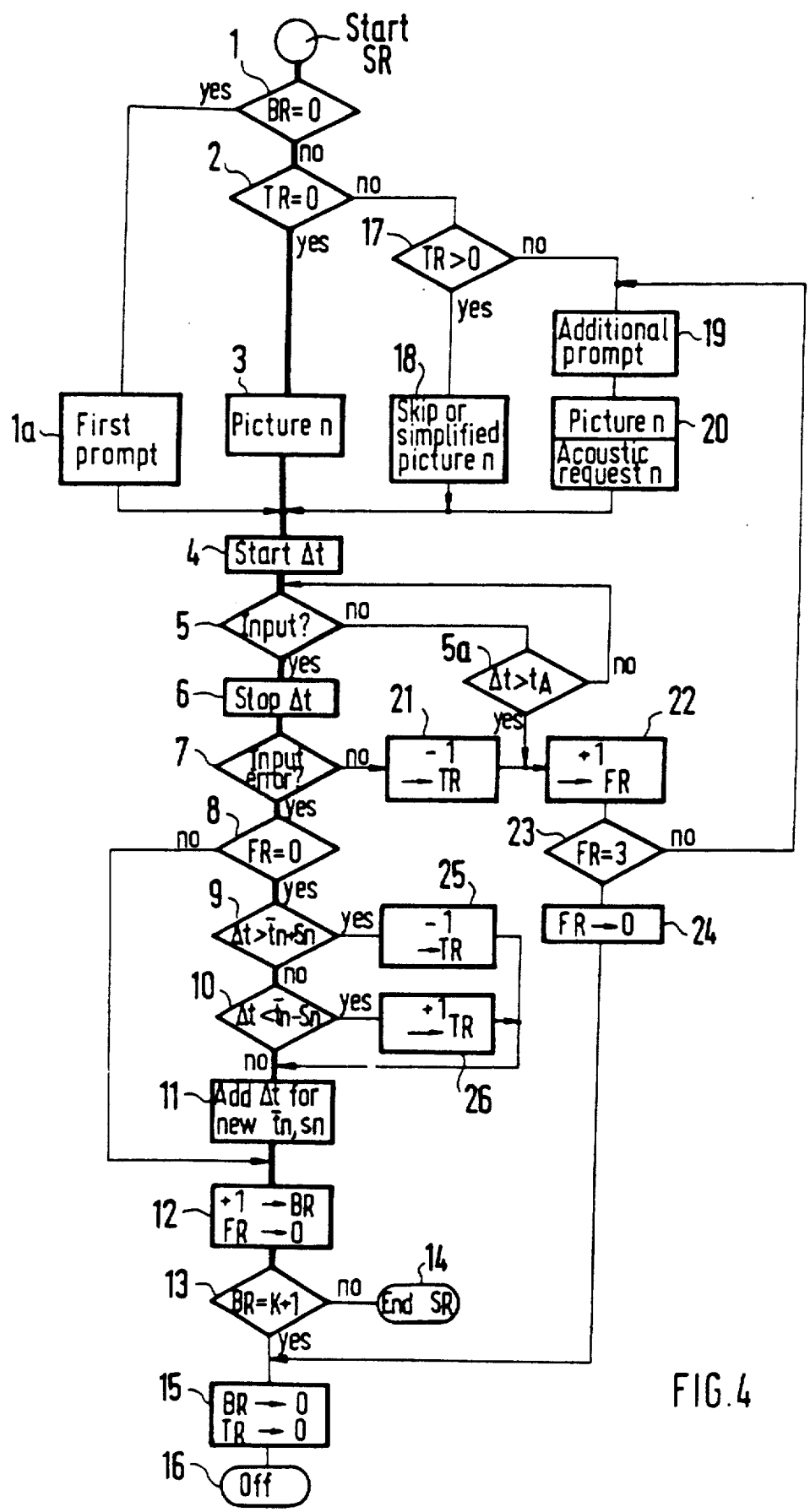
FIG. 4 is a flowchart serving to explain the method according to the invention.

In a first step 1, cf. FIG. 4, the count of the picture counter BR is sensed, and if BR=0, this indicates the beginning of a user guidance. After entering the telephone booth (monitored by an infrared motion detector, for example), the user is given a first prompt 1a, i.e., the credit display GA of the input unit E shows the amount 0.00 DM to indicate to the user that the video telephone BF is ready for service.

In step 4, cf. FIG. 4, the time-measuring unit ZE is started. In the next step 5 it is determined whether the user has already entered any information through the input unit E. If that is not the case, it will be determined in step 5a whether the time measured so far, $\Delta t$, is greater or less than a predetermined reference value $t_A$. The value $t_A$ can be chosen freely; in this embodiment, it may lie between 2 and 10 seconds.

If $\Delta t$ is less than the reference value $t_A$, step 5 will be repeated; if $\Delta t$ is greater, the user-error counter will be incremented by one in step 22. In step 23, the count of the user-error counter FR is sensed, and if the preset maximum value FR=3 has not been reached yet, execution jumps to step 19.

Since the measured time $\Delta t$ is greater than the predetermined reference value $t_A$, the user is classified as unpracticed, and an additional prompt is outputted beside the original prompt, picture n, step 20, where $1 \leq n \leq K$. This may be an acoustic request to insert the credit card into the card reader KL or a corresponding written request on the screen BS of the video telephone BF. Execution then jumps to step 4, i.e., the time $\Delta t$ is measured again.

If it is then determined in step 5 that information has been entered through the input unit E, the time measurement will be terminated in step 6. If the user has inserted the credit card into the card reader KL, i.e., if the input associated with the prompt has taken place, step 7, the count of the user-error counter FR will be sensed in step 8.

If it is determined in step 7 that the input through the input unit E was effected not by inserting the credit card into the card reader KL, but by operating one of the keys T1 to T5, for example, the user has made a mistake and will be classified as unpracticed.

The user counter TR is then decremented by one in step 21, and the user-error counter FR is incremented by one in step 22. This is followed by steps 23, 19, 20, and 4, as described above.

If it is found in step 23 that the count of the user-error counter is FR=3, i.e., that the maximum value F has been reached, the user-error counter FR will be set to zero in step 24. Then, the picture counter BR and the user counter TR will be set to zero in step 15, and the user guidance will be terminated in step 16.

This routine was chosen because, if a large number of user errors are determined for a prompt, it must be assumed that the user only wants to "play" with the video telephone, so that termination of the user guidance will be appropriate.

If it is found in step 7 that the credit card was inserted into the card reader KL, the count of the user-error counter FR will be sensed in step 8. If FR=0, it will be determined in step 9 whether the time determined by the time-measuring unit ZE is $\Delta t > \bar{t}n + sn$, i.e., whether it lies above the upper limit value $\bar{t}n + sn$. If so, the user counter TR will be decremented by one in step 25. If not, it will be determined in step 10 whether the measured time is $\Delta t < \bar{t}n - sn$, i.e., whether it lies below the lower limit value $\bar{t}n - sn$. If so, the user counter TR will be incremented by one. In either case, i.e., after step 25 or 26, step 11 is then performed as follows.

If the measured time $\Delta t$ lies neither above the upper limit value, step 9, nor below the lower limit value, step 10, the measured value will be used in step 11 to calculate a new average value tn and associated limit values determined by the standard deviation, and stored in the reference-data register RR in place of the hitherto stored reference values.

It is also possible to use the last, e.g., 30, measured time values for a prompt to calculate a new time-average value and corresponding limit values determined by the standard deviation.

Then, or if it was found in step 8 that the count of the user-error counter is FR>0, the picture counter BR will be incremented by one and the user-error counter FR set to zero in step 12. In step 13, the count of the picture counter BR is sensed. If BR=K+1, i.e., if BR=5 in this embodiment, the picture counter BR and the user counter TR will be set to zero in step 15 and the user guidance will be terminated in step 16.

However, since only the first user action, insertion of the credit card into the card reader KL, has been completed, the count of the picture counter BR is now BR=1 (step 13), and in step 14, execution jumps to step 1.

The count of the picture counter BR is now different from zero, so that the count of the user counter TR will be sensed in step 2. If TR=0, i.e., if a user has been classified as average, the next prompt, picture n, for the second action will be read from the memory S and displayed on the screen BS in step 3.

After insertion of the credit card, the video telephone is first switched to the self-viewing mode, i.e., the user's picture being taken by the video camera K is displayed on the screen BS together with the prompt that the picture can be shifted up or down by operating the first or second key T1, T2 of the input unit E.

Then, in step 4, the time $\Delta t$ is measured by the time-measuring unit ZE. Step 4 is followed by the same sequence as explained above for the first user action.

If it is found in step 2 that the count of the user counter TR is not equal to zero, the count will be checked in step 17 as to whether it is greater or less than zero. If it is greater than zero, i.e., if the user is practiced, the output of the next prompt will be skipped Or only a greatly simplified prompt will be given, step 18. This is followed by the start of the time measurement in step 4 and the sequence described above.

Should the user, because of the skipping of the prompt, be unable to adjust the picture, the user-error counter FR will be incremented by one, step 22, because the time $\Delta t$ is too long compared with the stored reference value $t_A$, step 5a, and the user will be given a corresponding prompt to adjust the picture, step 19.

If, in step 17, the count of the user counter TR is found to be less than zero, i.e., if the user is unpracticed, an additional prompt will be outputted directly in step 19, as described above. This additional prompt for adjusting the picture with the aid of the first and second keys T1, T2 can be outputted acoustically through the loudspeaker L or visually on the screen BS of the video telephone BF.

After the output of an additional prompt or the skipping of a prompt, the time measurement by the time-measuring unit ZE is started again in step 4. After completion of the second user action (user-error counter FR=0, step 2, and picture counter incremented by one, BR=2, step 13), step 1 follows for the third user action, i.e., the dialling of the wanted video-telephone subscriber via the push-button assembly TW. When this action has been completed, the picture counter BR has the value BR=3. After establishment of a connection, the self-viewing mode changes to the called-subscriber-viewing mode.

For the fourth user action, the user's attention is called to the possibility of adjusting the volume via the third key T3 (up) and the fourth key T4 (down) (after completion, BR=4), and for the fifth user action, a prompt is provided to the effect that the connection can be released with the aid of the fifth key T5.

After release of the connection, the credit card is returned (possibly accompanied by flashing of the credit display DA or by an attention tone), the amount used up is presented on the credit display DA, and the screen BS is turned off.

Since the count of the picture counter is now BR=K+1, step 13, the picture counter BR and the user counter TR are set to zero in step 15 and the user guidance is terminated in step 16.

Thus, adaptive guidance is implemented not only for different user, but also for the same user.

The method according to the invention makes it possible to classify a user for the next user action (cf. step 2 in FIG. 4) as less qualified, average, or more highly qualified. Furthermore, it is possible to correct any initial wrong qualifications in the course of the subsequent user actions.

This adaptive user guidance permits better utilization of the communication or data terminals but can be used in principle for any man-machine interface.

The skipping of prompts enables practiced users to use the terminal more steadily.

Unpracticed users will make fewer mistakes thanks to more detailed prompt. In both cases, the terminal becomes free for other users more quickly.

I claim:

1. A user terminal having an adaptive user interface, said terminal comprising:

a memory for storing a plurality of machine readable prompts each corresponding to at least one user action, a control unit for determining which of the prompts are required to guide a particular user through a given predetermined sequence of said user actions and for generating a sequence of output signals corresponding to the required prompts, output means responsive to the output signals from the control unit for outputting the required prompts in a form intelligible to said particular user, input means responsive to physical inputs from the particular user for supplying a machine readable user input signal to the control unit corresponding to each said user action performed by the particular user, a time-measuring unit for measuring a time which elapses from the output of each said output signal until the input of any said machine readable input signal, a user-error counter responsive to the control unit for determining whether each said machine readable input signal corresponds to an erroneous user action and for counting the number of erroneous said user input signals that were inputted by the input means following an output signal corresponding to a given prompt, and a reference-data register for storing typical user reference data corresponding to the predetermined sequence of user actions including an upper predetermined limit value and a lower predetermined limit value for each user action, wherein the control unit determines whether the elapsed time and the number of erroneous user inputs as respectively determined by the time-measuring unit and the user-error counter lie within, above, or below a reference-data interval defined by upper and lower predetermined limit values stored in the reference-data register for each user action, inserts at least one additional prompt into the sequence of user prompts to be output to that particular user by the output means by outputting one or more corresponding output signals, if the control unit determines that the elapsed time and the number of erroneous user inputs as respectively determined by the time-measuring unit and the user-error counter lie above the upper limit value, and deletes at least one following prompt from the sequence of user prompts to be output to that particular user by the output means by not outputting one or more corresponding output signals if the control unit determines that the elapsed time and the number of erroneous user inputs as respectively determined by the time-measuring unit and the user-error counter lie below the lower limit value.

2. A terminal as claimed in claim 1, further comprising a "picture" counter for counting a number of completed actions of the predetermined sequence of user actions from zero to a final value K wherein, upon reaching the count K+1, the picture counter is reset to zero by the control unit.

3. A terminal as claimed in claim 1, further comprising a user counter which is initially set at zero for each user, which is incremented by one whenever the control unit determines that a predetermined function of the elapsed time and the number of erroneous user inputs lies below the lower limit value, and is decremented by one whenever the said predetermined function lies above the upper limit value, and whose count is left unchanged if the said predetermined function lies within the reference-data interval defined by the limit values.

4. A terminal as claimed in claim 3, further comprising a "picture" counter for counting the number of completed actions of the predetermined sequence of user actions from zero to a final value K, upon reaching the count K+1, wherein the control unit sets the user counter to zero when the count of the picture counter is equal to K+1.

5. A terminal as claimed in claim 1, wherein the user-error counter is incremented by one with each said erroneous user input in response to a given prompt, and upon attainment of a predetermined maximum value F, the control unit terminates the user prompts and sets the user-error counter to zero.

6. A terminal as claimed in claim 5, wherein at a count of the user-error counter greater than zero and less than the maximum value F, at least one additional prompt is inserted into the predetermined sequence of user actions and output to the user by the output means under control of the control unit.

7. A method of providing adaptive guidance to a user of a terminal, the method comprising the following steps:

outputting in a form intelligible to said user a particular user prompt form a predetermined stored sequence of standard user prompts corresponding to a predetermined sequence of correct user actions;

measuring and storing a time which elapses from the output of said particular user prompt until the performance of an initial user action by said user;

determining whether said initial user action is correct or erroneous and if erroneous, whether any subsequent user action is correct or erroneous;

counting the initial and subsequent user actions by said user for each user prompt output to said user;

comparing the thus measured elapsed time and the thus counted erroneous user actions per user prompt with stored reference data for the predetermined sequence of correct user actions;

outputting a next prompt in the predetermined standard sequence of user prompts if the measured elapsed time and the counted user errors lie within a reference-data interval defined by an upper predetermined limit value and a lower predetermined limit value;

outputting at least one additional prompt inserted into the predetermined standard sequence of prompts if the measured elapsed time and the counted user errors lie above the upper limit; and skipping the output of at least one following prompt in the predetermined standard sequence of user prompts if the measured elapsed time and the counted user errors lie below the lower limit value.

8. A method as claimed in claim 7, wherein the stored reference data are calculated from the average and the standard deviation of previously measured elapsed time values.

9. A method as claimed in claim 8, wherein new limit values are calculated if a current value for the measured elapsed time lies within a thus previously calculated interval.

10. A method as claimed in claim 8, wherein a predetermined fixed number of previously measured time values for each user prompt are used to calculate the limit values.

11. A terminal as claimed in claim 1, wherein said output means comprises a visual display unit.

12. A terminal as claimed in claim 1, wherein said output means comprises a loudspeaker.

* * * * *

UNITED STATES PATENT AND TRADEMARK OFFICE
CERTIFICATE OF CORRECTION

PATENT NO. : 5,042,006
DATED : August 20, 1991
INVENTOR(S) : Walter Flohrer

Figure 1:
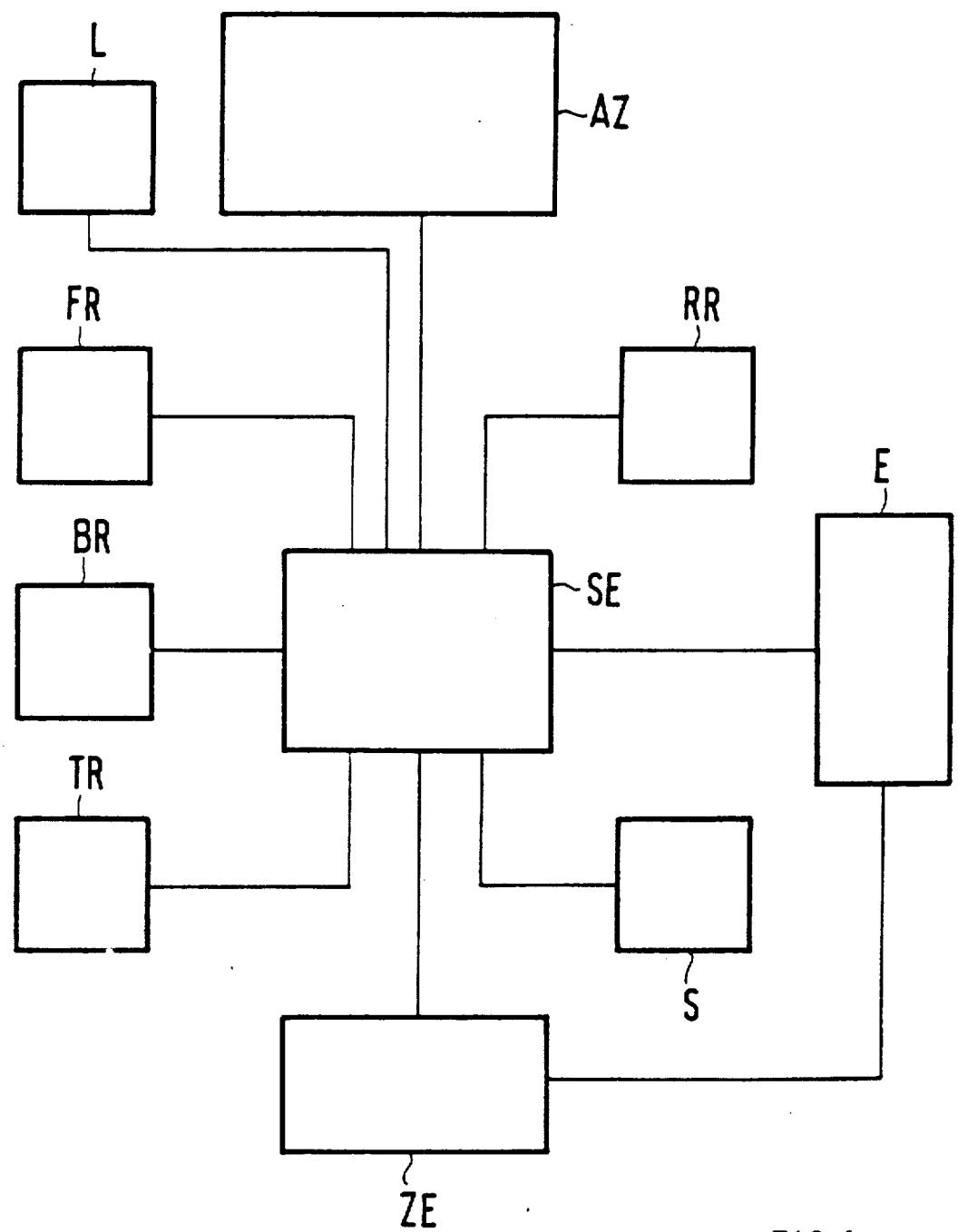
FIG. 1 is a block diagram of the circuit arrangement according to the invention.

It is certified that error appears in the above-identified patent and that said Letters Patent is hereby corrected as shown below:

In the drawings:

Sheet 1, FIG. 1, insert English language labels to all boxes as follows:

```
AZ - DISPLAY
L  - SPEAKER
FR - USER ERROR COUNTER
BR - PICTURE COUNTER
TR - USER COUNTER
SE - CONTROL UNIT
ZE - TIMER
RR - REFERENCE DATA REGISTER
S  - MEMORY
E  - INPUT DEVICE
```

Sheet 3, FIG. 4, change the legend in box 7 from "error?" to -- ok?--.

Column 1, line 16, change "German" to -- Germany --.
Column 1, lines 17,18, change "addition al" to -- additional --.
Column 1, line 19, change "sue" to -- use --.
Column 1, line 31, change "use" to -- user --.
Column 1, line 50, move the heading "DISCLOSURE OF INVENTION" to come before the paragraph "It is the object of the present invention . . ."

UNITED STATES PATENT AND TRADEMARK OFFICE
CERTIFICATE OF CORRECTION

PATENT NO. : 5,042,006
DATED : August 20, 1991
INVENTOR(S) : Walter Flohrer

It is certified that error appears in the above-identified patent and that said Letters Patent is hereby corrected as shown below:

Column 2, line 46, change "Ffg." to -- FIG. --.
Column 2, line 48, after "time" change "At" to -- $\Delta t$ --.

Column 4, line 2, after "if" change "At" to -- $\Delta t$ --.
Column 4, line 55, after "time" change "At" to -- $\Delta t$ --.

Column 5, line 30, after "skipped" change "Or" to -- or --.

Column 6, line 8, after "different" change "user" to
-- users --.
Column 6, line 21, after "detailed" change "prompt" to
-- prompts --.

Signed and Sealed this

Twenty-third Day of March, 1993

Attest:

STEPHEN G. KUNIN

Attesting Officer       Acting Commissioner of Patents and Trademarks